(12) United States Patent
Fukuda

(10) Patent No.: US 6,645,107 B2
(45) Date of Patent: Nov. 11, 2003

(54) EPICYCLE REDUCTION GEAR HAVING A BUILT-IN HYDRAULIC MOTOR

(75) Inventor: Eiiti Fukuda, Ishikawa (JP)

(73) Assignee: Komatsu Ltd., Tokyo (JP)

( * ) Notice: Subject to any disclaimer, the term of this patent is extended or adjusted under 35 U.S.C. 154(b) by 39 days.

(21) Appl. No.: 09/799,038

(22) Filed: Mar. 6, 2001

(65) Prior Publication Data

US 2001/0021681 A1 Sep. 13, 2001

(30) Foreign Application Priority Data

Mar. 9, 2000 (JP) ........................................ 2000-064456

(51) Int. Cl.⁷ .............................................. F16H 47/04
(52) U.S. Cl. ............................ 475/83; 475/31; 475/346
(58) Field of Search ............................... 475/83, 31, 84, 475/330, 335, 346

(56) References Cited

U.S. PATENT DOCUMENTS 5,078,660 A * 1/1992 Williams et al. ............ 180/250

FOREIGN PATENT DOCUMENTS

| JP | 59-147154 | | 8/1984 |
|----|-----------|---|--------|
| JP | 61-252935 | A * | 10/1986 |
| JP | 4-43 | | 1/1992 |
| JP | 7-28440 | | 6/1995 |
| JP | 11-22789 | | 1/1999 |

* cited by examiner

Primary Examiner—Pam Rodriguez
(74) Attorney, Agent, or Firm—Armstrong, Westerman & Hattori, LLP.

(57) ABSTRACT

In an epicycle reduction gear arrangement having a built-in hydraulic motor, a rotation drum formed with internal teeth is rotatably attached to an outer peripheral side of a hydraulic motor housing and a planetary gear is arranged between an output shaft of a hydraulic motor projecting and extending from the hydraulic motor housing and the internal teeth of the rotation drum to thereby rotate the rotation drum in a speed reduced manner. The hydraulic motor housing is provided with a shell portion to which the rotation drum is fitted through a rotation bearing and a carrier member carrying both ends of a planetary gear shaft and having an outer diameter less than an inner diameter of the rotation bearing, the carrier member being formed integrally to an outer end surface portion of the hydraulic motor housing.

4 Claims, 2 Drawing Sheets

EPICYCLE REDUCTION GEAR HAVING A BUILT-IN HYDRAULIC MOTOR

BACKGROUND OF THE INVENTION

The present invention relates to an epicycle reduction gear or gear arrangement in which a hydraulic motor is built to be used for a drive device of an endless crawler belt or caterpillar band.

For a conventional epicycle reduction gear having a built-in hydraulic motor, Japanese Patent Laid-open Publication No. SHO 59-147154, Japanese Patent Laid-open Publication No. HEI 11-22789 and Japanese Patent Laid-open Publication No. HEI 4-43 disclose a planetary gear carrier structure of the epicycle reduction gear disposed adjacent to a hydraulic motor housing.

In the structure disclosed in the Japanese Patent Laid-open Publication No. SHO 59-147154, an axial external tooth spline is formed to an outer diameter side of an outer end surface of a hydraulic motor housing, and an axial internal tooth spline formed to an outer diameter side of one side carrier of a carrier carrying both ends of a planetary gear shaft of the epicycle reduction gear is meshed with the outer tooth spline mentioned above. According to such structure, the carrier carrying both ends of the planetary gear shaft is formed independently from the hydraulic motor housing and is integrally secured to the hydraulic motor housing.

On the other hand, in the structure disclosed in the Japanese Patent Laid-open Publication No. HEI 11-22789, a carrier carrying both ends of a planetary gear shaft is independently formed from the hydraulic motor housing and is fastened by means of bolts to an outer end surface of the hydraulic housing case so that the carrier carrying both ends of the planetary gear shaft is integrally secured to the hydraulic motor housing case.

Furthermore, in the structure of the Japanese Patent Laid-open Publication No. HEI 4-43, a support shaft (cantilever shaft) supporting one end of a planetary gear of an epicycle reduction gear is formed to an outer end surface of a hydraulic motor housing case so as to project outward therefrom, and a planetary gear is mounted to this support shaft so that the planetary gear is mounted to the outer end side of the hydraulic motor housing case to be rotatable.

Furthermore, in the epicycle reduction gears or gear arrangements disclosed in the above-mentioned Japanese Patent Laid-open Publication No. SHO 59-147154, Japanese Patent Laid-open Publication No. HEI 11-22789 and Japanese Patent Laid-open Publication No. HEI 4-43, needle bearings rolling around planetary gear shafts are utilized as rotation bearings for the planetary gears.

However, in the structure of mounting the carrier carrying both ends of the planetary gear shaft to the hydraulic motor housing disclosed in the Japanese Patent Laid-open Publication No. SHO 59-147154, the outer diameter of the planetary gear carrier is larger than that of the outer end surface of the hydraulic motor housing case, and hence, an outer diameter of a cylindrical drum rotating on an outer peripheral side of the hydraulic motor housing case is inevitably made large. Accordingly, in a case where such reduction gear mechanism as shown in this Japanese Patent Laid-open Publication No. SHO 59-147154 is utilized as a crawler belt drive device for a vehicle, such as bull-dozer traveling at a fast speed, the rotational peripheral speed of the cylindrical drum will be made fast, which may give an adverse influence on a wearing (abrasion) lifetime of a mechanical seal ring disposed between the cylindrical drum and the hydraulic motor housing case for preventing lubrication oil in the reduction gear from leaking and preventing sediment, soil, small stone, and the like from invading inside. In order to obviate such defect, it has been desired to make reduced an outer diameter of the carrier carrying both ends of the planetary gear shaft to thereby reduce the outer diameter of the cylindrical drum.

Furthermore, in the epicycle reduction gears or gear arrangements disclosed in the Japanese Patent Laid-open Publication No. SHO 59-147154 and Japanese Patent Laid-open Publication No. HEI 11-22789, needle bearings rolling around the planetary gear shafts are utilized as rotation bearings for the planetary gears.

However, in such structures, since a surface pressure is directly loaded to the planetary gear shaft, it becomes necessary to use a planetary gear shaft having a large diameter in the viewpoint of durability and/or strength, which results in an enlargement of the outer diameter of the carrier carrying both ends of the planetary gear shaft. And, it becomes necessary to make high a thrust receiving wall section of the needle bearing, thereby, in cooperation of the enlargement of the diameter of the planetary gear shaft, the outer diameter of the carrier carrying both ends of the planetary gear shaft is made further widened. Because of such reasons mentioned above, the outer diameter of the carrier is made larger than the outer diameter of the hydraulic motor housing case, and hence, the outer diameter of the cylindrical drum rotating on the outer peripheral side of the hydraulic motor housing case becomes inevitably large. It is therefore desired to make reduced the outer diameter of the carrier as well as to improve the planetary gear rotation bearing means with respect to the planetary gear shaft.

Still furthermore, as disclosed in the Japanese Patent Laid-open Publication No. HEI 4-43, in the structure that the planetary gear cantilever support shaft of the epicycle reduction gear is formed, in a projecting manner, to the outer end surface of the hydraulic motor housing case, the planetary gear cantilever support shaft does not exceed the outer diameter of the hydraulic motor housing case, so that the outer diameter of the cylindrical drum rotating on the outer peripheral side of the hydraulic motor housing case can be made smaller. However, this structure provides such a problem as that the cantilever support shaft, which is supported at only one side, may be bent, thus being not practical.

Still furthermore, in the structures of the Japanese Patent Laid-open Publication Nos. SHO 59-147154 and HEI 11-22789, since one side thickened portion of the carrier is overlapped to the hydraulic motor housing case, the axial dimensions of the epicycle reduction gear is made long, and in a case where a crawler belt having a narrow width is utilized, there may cause a case that the end edge of the planetary reduction gear extends beyond over the width of the crawler belt and not disposed within this width, so that there is a fear of damaging the epicycle reduction gear having a built-in hydraulic motor, thus providing a problem, which has been desired to be solved by reducing the axial dimension of the epicycle reduction gear or gear arrangement.

SUMMARY OF THE INVENTION

An object of the present invention is to substantially eliminate defects or drawbacks encountered in the prior art mentioned above and to provide an epicycle reduction gear having a built-in hydraulic motor in which a carrier carrying both ends of a planetary gear shaft is monolithically formed to an outer end surface side of the hydraulic motor housing, reducing an outer diameter of the carrier to be less than an inner diameter of a rotation (rotating) bearing of a rotation (rotating) drum.

This and other object can be achieved according to the present invention by providing an epicycle reduction gear having a built-in hydraulic motor in which a rotation drum formed with internal teeth is rotatably attached to an outer peripheral side of a hydraulic motor housing in which a hydraulic motor is housed and a planetary gear is arranged between an output shaft of the hydraulic motor projecting and extending from the hydraulic motor housing and the internal teeth of the rotation drum to thereby rotate the rotation drum in a speed reduced manner, wherein the hydraulic motor housing is provided with a shell portion to which the rotation drum is fitted through a rotation bearing and a carrier member carrying both ends of a planetary gear shaft and having an outer diameter less than an inner diameter of the rotation bearing is formed monolithically to an outer end surface portion of the hydraulic motor housing.

According to this structure of this aspect, since the carrier member carrying both ends of a planetary gear shaft is formed monolithically to an outer end surface portion of the hydraulic motor housing, it is not necessary to provide a coupling mount portion which is needed in a structure that a carrier member carrying both ends of the planetary gear shaft is overlapped and coupled to the outer diameter side of the outer end surface portion of the hydraulic motor housing which is formed independently from the carrier member, thus reducing the radial length of the carrier member.

Moreover, a portion of the carrier member on the one side thereof is substituted, in function, with the hydraulic motor housing, so that the axial length of the carrier member is more reduced than one in a structure that a carrier member carrying both ends of the planetary gear shaft is overlapped and coupled to the outer end surface portion of the hydraulic motor housing which is formed independently from the carrier member.

Furthermore, since the carrier member carrying both ends of a planetary gear shaft is formed monolithically to an outer end surface portion of the hydraulic motor housing, the strength of the carrier member against the bending force can be increased and an easy inclination of the planetary gear shaft can be prevented.

Still furthermore, since the outer diameter of the carrier member is made less than the inner diameter of the rotation bearing for the rotation drum which is fitted to the shell portion (outer peripheral portion) of the hydraulic motor, the rotation bearing can be easily and smoothly fitted from the outer end surface side of the hydraulic motor housing.

In a preferred example of this aspect, the carrier member comprises: a plurality of girders formed monolithically to an outer end surface portion of the hydraulic motor housing at substantially equal intervals in a circumferential direction thereof so as to project in an axial direction thereof; an annular carrier wall section monolithically formed to projected front end portions of the girders with a parallel space to the outer end surface portion of the hydraulic motor housing, the annular carrier wall section having an outer diameter less than an outer diameter of the outer end surface portion and being provided, at a radially central portion thereof, with an insertion hole through which the output shaft of the hydraulic motor is inserted; and a planetary gear support shaft portion disposed between the annular carrier wall section and the outer end wall section of the hydraulic motor housing.

According to this structure, the carrier member composed of a plurality of girders and the annular carrier wall section is formed to the outer end surface side of the hydraulic motor housing to be monolithic therewith and the planetary gear support shaft portion is disposed between the outer end wall section of the hydraulic motor housing and the annular carrier wall section so as to support the planetary gear. Therefore, the planetary gear support shaft portion is carried at its both end portions, thus providing a rigid and strong structure of the planetary gear support portion.

In another preferred example, a planetary gear shaft of the planetary gear support shaft portion has one end inserted into a shaft bore formed to the outer end wall section of the hydraulic motor housing and another one end inserted into a shaft bore formed to the annular carrier wall section, a fastening bolt penetrates the interior of the planetary gear shaft in an axial direction thereof and fastens the planetary gear shaft to the outer end wall section of the hydraulic motor housing, and the planetary gear is mounted to the planetary gear shaft through a taper roller bearing to be rotatable.

According to this structure, since the taper roller bearing is used, the planetary gear shaft does not constitutes a roller rolling surface and a surface pressure is not directly applied to the planetary gear shaft. Accordingly, the diameter of the planetary gear shaft can be reduced, and moreover, in the annular carrier wall section having the outer diameter less than the inner diameter of the rotation bearing for the rotation drum, the planetary gear shaft can be supported. Furthermore, since the diameter of the planetary gear shaft is reduced, the planetary gear shaft can be arranged in the space between the outer end wall section of the hydraulic motor housing and the annular carrier wall section, and the outer end wall section of the hydraulic motor housing and the annular carrier wall section can be formed as a position defining wall sections of the taper roller bearing in the axial direction thereof. The planetary gear support shaft portion can be arranged between the outer end wall section of the hydraulic motor housing for fitting the rotation bearing for the rotation drum and the carrier member having the outer diameter less than the inner diameter of the rotation bearing.

In a more structural arrangement, the above object may be achieved by providing an epicycle reduction gear comprising:

a hydraulic motor housing in which a hydraulic motor is housed;

a rotation drum fixed to an outer peripheral side of the hydraulic motor housing through a rotation bearing to be rotatable;

a planetary gear disposed between internal teeth of the rotation drum and an output shaft of the hydraulic motor and supported by a planetary gear support shaft portion; and a carrier member carrying both ends of the planetary gear shaft, including the planetary gear support shaft portion, having an outer diameter less than an inner diameter of the rotation bearing and being formed monolithically to an outer end surface portion of the hydraulic motor housing.

According to this aspect, substantially the same functions and effects as mentioned above will be achieved.

Further, it is to be noted that the nature and further characteristic features of the present invention will be made more clear from the following descriptions made with reference to the accompanying drawings.

DESCRIPTION OF THE PREFERRED EMBODIMENTS

A preferred embodiment of an epicycle reduction gear or gear arrangement housed with a hydraulic motor of the present invention will be described hereunder with reference to the accompanying drawings.

Figure 1:
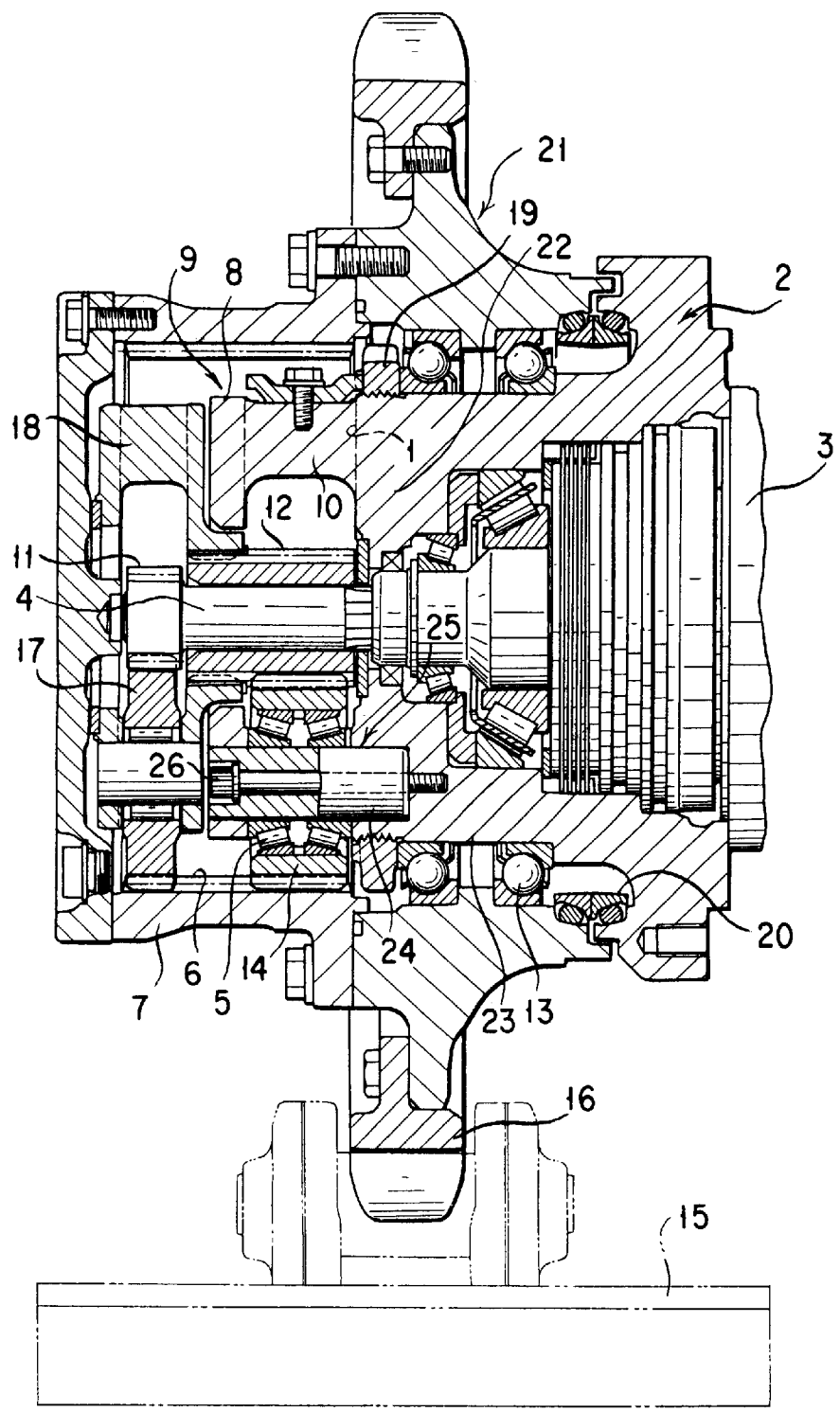
FIG. 1 is an elevational section of an epicycle reduction gear housed with a hydraulic motor according to one embodiment of the present invention.
Figure 2:
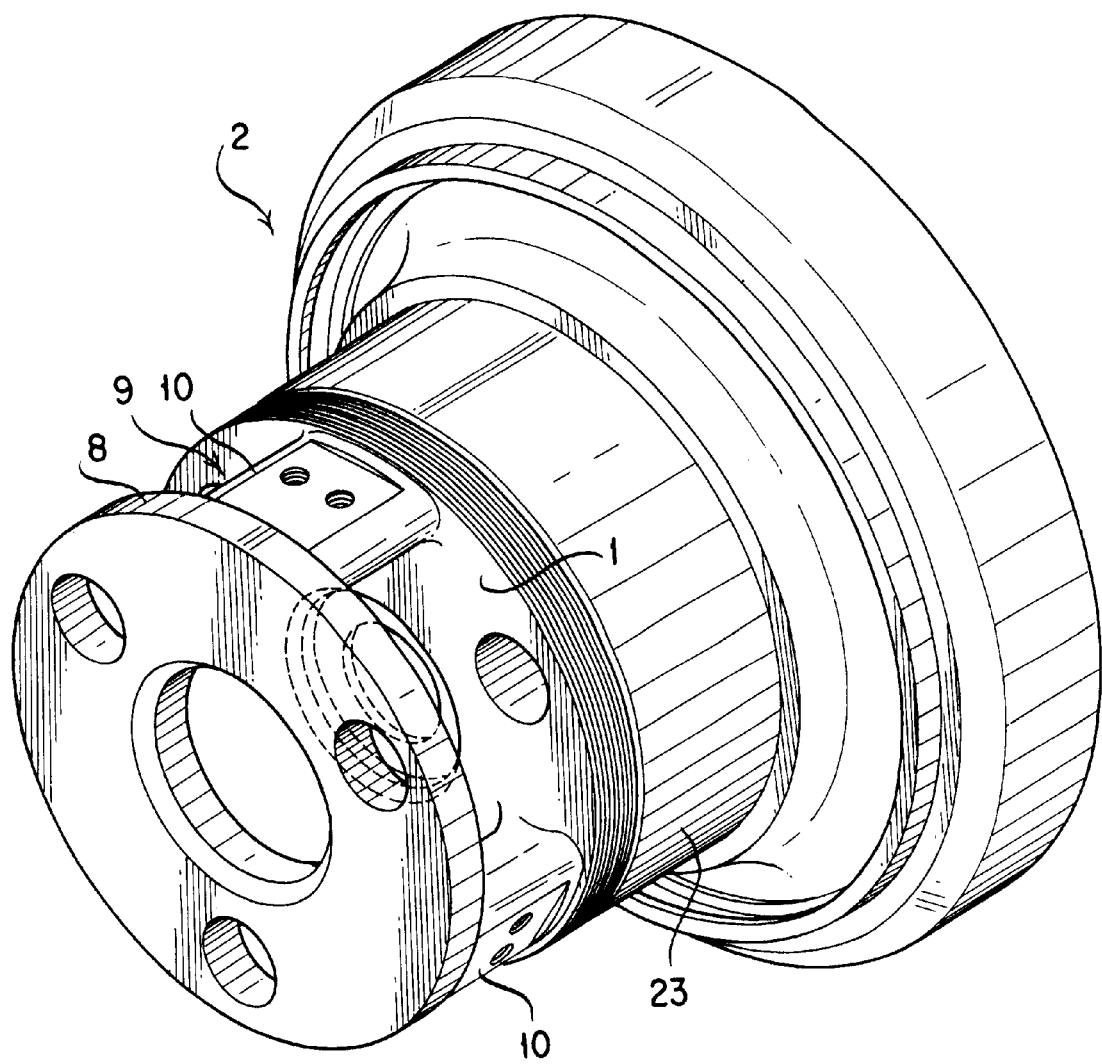
FIG. 2 is a perspective view of a hydraulic motor housing of the hydraulic motor of the epicycle reduction gear shown in FIG. 1.

With reference to FIG. 1, a hydraulic motor housing is designated by a reference numeral 2, the hydraulic motor housing 2 has an outer peripheral side, to which a rotation (rotating) drum 21 is mounted through a pair of rotation (rotating) bearings 13. The rotation drum 21 is composed of a drive wheel 16 and a cylinder 7 formed with inner teeth 6 which are secured integrally by means of bolts. A hydraulic motor 3 is also mounted to an inside portion of the hydraulic motor housing 2 by fastening means, not shown, and a mechanical sealing 20 is disposed between the rotation drum 21 which is rotatable and the hydraulic motor housing 2 which is not rotatable so as to prevent sediment, soil, small stone or the like from entering from an external side and prevent lubrication oil from leaking from an inside of the hydraulic motor housing 2.

The hydraulic motor housing 2 is monolithically composed of a shell portion 23 to which the rotation bearing 13 of the rotation drum 21 is fitted, an outer end wall section 22 formed with a through hole through which an output shaft (driving shaft) 4 of the hydraulic motor and a carrier 9 carrying both ends of the planetary gear shaft, which hereinlater may be called merely "carrier".

The carrier 9 carrying both ends of the planetary gear shaft comprises a plurality of girders or beam members 10 and an annular carrier wall section 8. The girders 10 are formed, to an outer end surface 1 of the wall section 22 with equal interval therebetween in the circumferential direction, to be integral with the hydraulic motor housing 2 so as to project from the outer end surface 1 of the outer wall section 22 in the axial direction thereof, and the annular carrier wall section 8 is disposed at an interval parallel to the outer end surface 1 of the motor housing wall section 22 and is monolithically formed to the projecting end sides of the girders 10, the outer diameter of the wall section 8 being made less than an inner diameter of the rotation bearing 13 of the rotation drum 21.

Furthermore, the hydraulic motor housing 2 is provided with a plurality of planetary gear support shaft members 25 each supporting the planetary gear 14. The planetary gear support shaft members 25 are disposed in the circumferential spaces between the beam members 10, respectively, and arranged between the annular carrier wall section 8 and the outer end surface wall section 22 so as to be parallel to the hydraulic motor output shaft 4 projecting from the wall section 22.

The planetary gear support shaft member 25 comprises a planetary gear shaft 24 having a small diameter and having one side portion inserted into a shaft bore formed to the outer end surface wall section 22 of the hydraulic motor housing 2 and the other side portion inserted into a shaft bore formed to the annular carrier wall section 8, a fastening (mounting) bolt 26 penetrating axially inside the planetary gear shaft 24 and fastening the same to the outer end wall section 22 of the hydraulic motor housing 2, and a pair of taper roller bearings 5, 5 supporting rotatably the planetary gear 14 with respect to the planetary gear shaft 24. These planetary gears 14 are inserted from the radial side into the circumferential spaces between the girders 10, respectively, and are arranged in spaces between the annular carrier wall section 8 and the outer end wall section 22 to be thereby supported by the planetary gear support shaft members 25, respectively.

Further, the hydraulic motor output shaft 4 having an axial length extending over the annular carrier wall section 8 is arranged in the insertion hole formed to the radial central portion of the outer end wall section 22 and the annular carrier wall section 8.

The hydraulic motor output shaft 4 is provided with a first sun gear 11 formed integrally with this shaft 4 and a second sun gear 12 disposed to be rotatable about this shaft 4.

The first sun gear 11 is meshed with a first planetary gear 17 which is rotatably supported by a first planetary carrier 18 meshed with the second sun gear 12 and which is meshed with an internal tooth 6 of the rotation drum 21 and adapted to transmit, at a first reduction ratio, a rotational power from the hydraulic motor output shaft 4 through the first planetary carrier 18 to the second sun gear 12 by rotating and revolving the first planetary gear 17.

On the other hand, the second sun gear 12 meshed with planetary gear 14 is rotated by the first planetary carrier 18 rotated by the rotating and revolving motions of the first planetary gear 17 and adapted to drive the rotation drum 21 at a second reduction ratio by revolving the second planetary gear as the planetary gear 14 meshed with the internal teeth 6 of the rotation drum 21.

According to the epicycle reduction gear of the present invention of the structures mentioned above, the following advantageous functions will be achieved.

The annular carrier wall section 8 supporting one end of the planetary gear shaft 24 of the planetary gear arrangement is monolithically formed to the end portion of the hydraulic motor housing 2 with a distance from the outer end wall section 22 of the hydraulic motor housing 2 and this outer end wall section 22 is substituted for a planetary gear shaft support portion supporting another end of the planetary gear shaft 24. Accordingly, the axial length of the epicycle reduction gear can be reduced by an amount corresponding to the above substitution, and hence, the present invention can be applied as the hydraulic motor housed epicycle reduction gear arrangement to be used for a crawler belt drive mechanism for the crawler belt 15 having a narrow width.

Furthermore, according to the structure in which the taper roller bearings 5, 5 are adopted as bearings for the planetary gear 14 to reduce the diameter of the planetary gear support shaft portion 25, the planetary gear support shaft portion 25 can be mounted between the annular carrier wall section 8 and the outer end wall section 22 of the hydraulic motor housing 2 in a range less than the outer diameter of the shell portion 23 of the hydraulic motor housing 2 (i.e. less than the inner diameter of the rotation bearing 13 of the rotation drum 21). Therefore, the outer diameters of the annular carrier wall section 8 and the outer end wall section of the hydraulic motor housing 2 can be reduced, which hence results in the reduction of the diameter of the rotation drum 21 for mounting the drive wheel 16 which is rotatably mounted to the outer peripheral side of the hydraulic motor housing 2.

Thus, the rotation peripheral speed of the rotation drum 21 can be reduced, which contributes to the expansion of the abrasion lifetime of the mechanical seal ring 20 disposed between the hydraulic motor housing 2 and the rotation drum 21.

Further, it is to be noted that although the present invention has been described to be applied to an epicycle reduction gear housed with a hydraulic motor, the present invention is not limited to such specific embodiment or application, and it will be apparent to those skilled in the art that various modifications, changes, omissions, additions and other variations can be made in the disclosed embodiments of the present invention without departing from the scope or spirit of the present invention. Accordingly, the present invention should be understood by the proper comprehension of the wide scope of the appended claims.

What is claimed is:

1. An epicycle reduction gear arrangement having a built-in hydraulic motor in which a rotation drum formed with internal teeth is rotatably attached to an outer peripheral side of a hydraulic motor housing in which the hydraulic motor is housed and a planetary gear is arranged between an output shaft of the hydraulic motor projecting and extending from the hydraulic motor housing and the internal teeth of the rotation drum to thereby rotate the rotation drum in a speed reduced manner, wherein the hydraulic motor housing is provided with a shell portion to which the rotation drum is fitted through a rotation bearing and a carrier member carrying both ends of a planetary gear shaft and having an outer diameter less than an inner diameter of an inner race of the rotation bearing is formed monolithically to an outer end surface portion of the hydraulic motor housing.

2. An epicycle reduction gear arrangement according to claim 1, wherein said carrier member comprises: a plurality of girders formed monolithically to an outer end surface portion of the hydraulic motor housing at substantially equal intervals in a circumferential direction thereof so as to project in an axial direction thereof; an annular carrier wall section monolithically formed to projected front end portions of the girders with a parallel space to the outer end surface portion of the hydraulic motor housing, said annular carrier wall section having an outer diameter less than an outer diameter of the outer end surface portion and being provided, at a radially central portion thereof, with an insertion hole through which the output shaft of the hydraulic motor is inserted; and a planetary gear support shaft portion disposed between the annular carrier wall section and an outer end wall section of the hydraulic motor housing.

3. An epicycle reduction gear arrangement according to claim 2, wherein the planetary gear shaft of said planetary gear support shaft portion has one end inserted into a shaft bore formed to the outer end wall section of the hydraulic motor housing and another one end inserted into a shaft bore formed to the annular carrier wall section, a fastening bolt penetrates inside the planetary gear shaft in an axial direction thereof and fastens the planetary gear shaft to the outer end wall section of the hydraulic motor housing, and the planetary gear is mounted to the planetary gear shaft through a taper roller bearing to be rotatable.

4. An epicycle reduction gear arrangement comprising:

a hydraulic motor housing in which a hydraulic motor is housed;

a rotation drum fixed to an outer peripheral side of the hydraulic motor housing through a rotation bearing to be rotatable;

a planetary gear disposed between internal teeth of the rotation drum and an output shaft of the hydraulic motor and supported by a planetary gear support shaft portion; and a carrier member carrying both ends of a planetary gear shaft, including said planetary gear support shaft portion, having an outer diameter less than an inner diameter of an inner race of the rotation bearing and being formed monolithically to an outer end surface portion of the hydraulic motor housing.

* * * * *